United States Patent
Chan et al.

(10) Patent No.: US 10,108,554 B2
(45) Date of Patent: Oct. 23, 2018

(54) APPARATUSES, METHODS, AND SYSTEMS TO SHARE TRANSLATION LOOKASIDE BUFFER ENTRIES

(71) Applicant: Intel Corporation, Santa Clara, CA (US)

(72) Inventors: Chung-Lun Chan, Hillsboro, OR (US); Ramon Matas, Newburyport, MA (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 15/369,819

(22) Filed: Dec. 5, 2016

(65) Prior Publication Data

US 2018/0157598 A1  Jun. 7, 2018

(51) Int. Cl.
*G06F 12/0891* (2016.01)
*G06F 12/1009* (2016.01)
*G06F 12/1027* (2016.01)

(52) U.S. Cl.
CPC ...... *G06F 12/1027* (2013.01); *G06F 12/0891* (2013.01); *G06F 12/1009* (2013.01); *G06F 2212/657* (2013.01); *G06F 2212/68* (2013.01); *G06F 2212/683* (2013.01)

(58) Field of Classification Search
CPC ........ G06F 12/0891; G06F 12/1027–12/1063; G11C 7/20; G11C 11/4072
See application file for complete search history.

(56) References Cited

U.S. PATENT DOCUMENTS 4,879,687 A * 11/1989 Okamoto ............ G06F 12/0891
                                                365/189.16
6,233,652 B1 * 5/2001 Mathews ............ G06F 12/1027
                                                365/202

(Continued)

FOREIGN PATENT DOCUMENTS

EP   1622033 A1   2/2006
TW   I253015 B    4/2006

OTHER PUBLICATIONS

Heald et al. "A 6-ns Cycle 256-kb Cache Memory and Memory Management Unit." Nov. 1993. IEEE. IEEE Journal of Solid-State Circuits. vol. 28. pp. 1078-1083.*
Final Office Action from U.S. Appl. No. 13/997,789 dated Jul. 8, 2015, 14 pages.
Final Office Action from U.S. Appl. No. 13/997,789 dated Jun. 13, 2016, 15 pages.

(Continued)

*Primary Examiner* — Nathan Sadler
(74) *Attorney, Agent, or Firm* — Nicholson De Vos Webster & Elliott LLP

(57) ABSTRACT

Methods, systems, and apparatuses relating to sharing translation lookaside buffer entries are described. In one embodiment, a processor includes one or more cores to execute a plurality of threads, a translation lookaside buffer comprising a plurality of entries, each entry comprising a virtual address to physical address translation and a plurality of bit positions, and each set bit of the plurality of bit positions in each entry indicating that the virtual address to physical address translation is valid for a respective thread of the plurality of threads, and a memory management circuit to clear all set bits for a thread by asserting a reset command to a respective reset port of the translation lookaside buffer for the thread, wherein the translation lookaside buffer comprises a separate reset port for each of the plurality of threads.

24 Claims, 11 Drawing Sheets

(56) References Cited

U.S. PATENT DOCUMENTS

| | | | |
|---|---|---|---|
| 6,466,504 B1* | 10/2002 | Roy | G11C 7/20 |
| | | | 365/185.29 |
| 7,430,643 B2 | 9/2008 | Jordan et al. | |
| 8,645,666 B2 | 2/2014 | Glew | |
| 2002/0144081 A1 | 10/2002 | Willis et al. | |
| 2003/0018877 A1 | 1/2003 | Gaskins et al. | |
| 2005/0027960 A1 | 2/2005 | Dement et al. | |
| 2006/0161760 A1 | 7/2006 | Jordan et al. | |
| 2008/0162868 A1 | 7/2008 | Glew | |
| 2014/0189314 A1* | 7/2014 | Kurts | G06F 9/30145 |
| | | | 712/216 |
| 2014/0223141 A1 | 8/2014 | Combs et al. | |
| 2016/0041922 A1* | 2/2016 | Parks | G06F 12/1036 |
| | | | 711/207 |
| 2016/0048453 A1* | 2/2016 | Koehler | G06F 12/1027 |
| | | | 711/154 |
| 2017/0083240 A1* | 3/2017 | Rogers | G06F 3/065 |

OTHER PUBLICATIONS

International Preliminary Report on Patentability for Application No. PCT/US2011/067925 dated Jul. 10, 2014, 7 pages.

International Search Report for Application No. PCT/US2011/067925 dated Sep. 26, 2012, 3 pages.

Non-Final Office Action from U.S. Appl. No. 13/997,789 dated Feb. 35, 2015, 13 pages.

Non-Final Office Action from U.S. Appl. No. 13/997,789 dated Feb. 17, 2016, 14 pages.

Non-Final Office Action from U.S. Appl. No. 13/997,789 dated Nov. 18, 2016, 21 pages.

Office action and Search Report with Summarized English Translation from Taiwan Patent Application No. 101149319, dated Apr. 30, 2015, 17 pages.

Office action with English translation from Taiwan Patent Application No. 101149319, dated Nov. 30, 2015, 9 pages.

Written Opinion for Application No. PCT/US2011/067925 dated Sep. 26, 2012, 5 pages.

* cited by examiner

300 

PROVIDING A TRANSLATION LOOKASIDE BUFFER COMPRISING A PLURALITY OF ENTRIES, EACH ENTRY COMPRISING A VIRTUAL ADDRESS TO PHYSICAL ADDRESS TRANSLATION AND A PLURALITY OF BIT POSITIONS, AND EACH SET BIT OF THE PLURALITY OF BIT POSITIONS IN EACH ENTRY INDICATING THAT THE VIRTUAL ADDRESS TO PHYSICAL ADDRESS TRANSLATION IS VALID FOR A RESPECTIVE THREAD OF A PLURALITY OF THREADS 302

CLEARING ALL SET BITS FOR A THREAD BY A MEMORY MANAGEMENT CIRCUIT ASSERTING A RESET COMMAND TO A RESPECTIVE RESET PORT OF THE TRANSLATION LOOKASIDE BUFFER FOR THE THREAD, WHEREIN THE TRANSLATION LOOKASIDE BUFFER COMPRISES A SEPARATE RESET PORT FOR EACH OF THE PLURALITY OF THREADS 304

FIG. 3

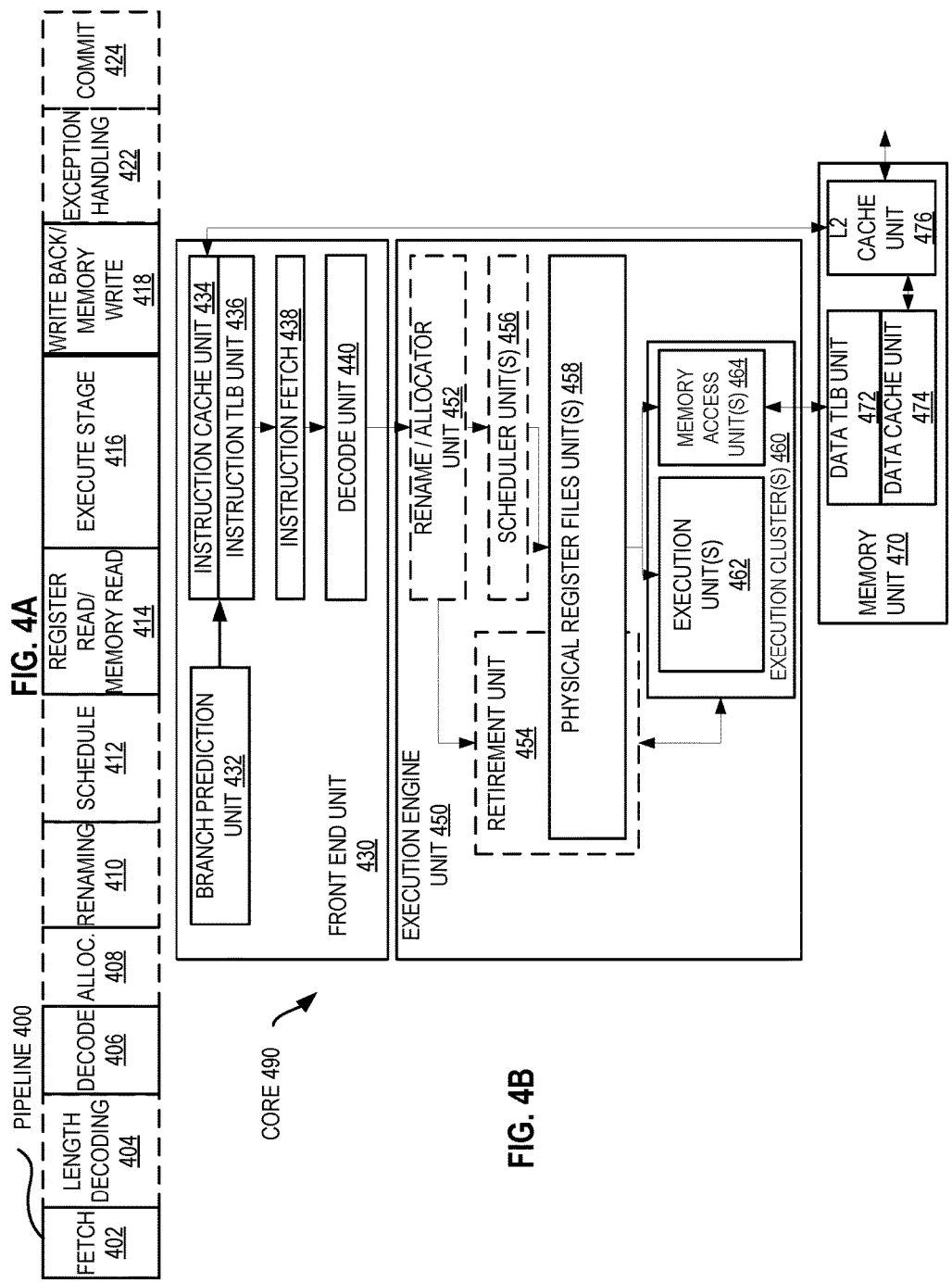

APPARATUSES, METHODS, AND SYSTEMS TO SHARE TRANSLATION LOOKASIDE BUFFER ENTRIES

TECHNICAL FIELD

The disclosure relates generally to electronics, and, more specifically, an embodiment of the disclosure relates to a memory management circuit to share translation lookaside buffer entries.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3 illustrates a flow diagram according to embodiments of the disclosure.

FIG. 4A is a block diagram illustrating both an exemplary in-order pipeline and an exemplary register renaming, out-of-order issue/execution pipeline according to embodiments of the disclosure.

FIG. 4B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
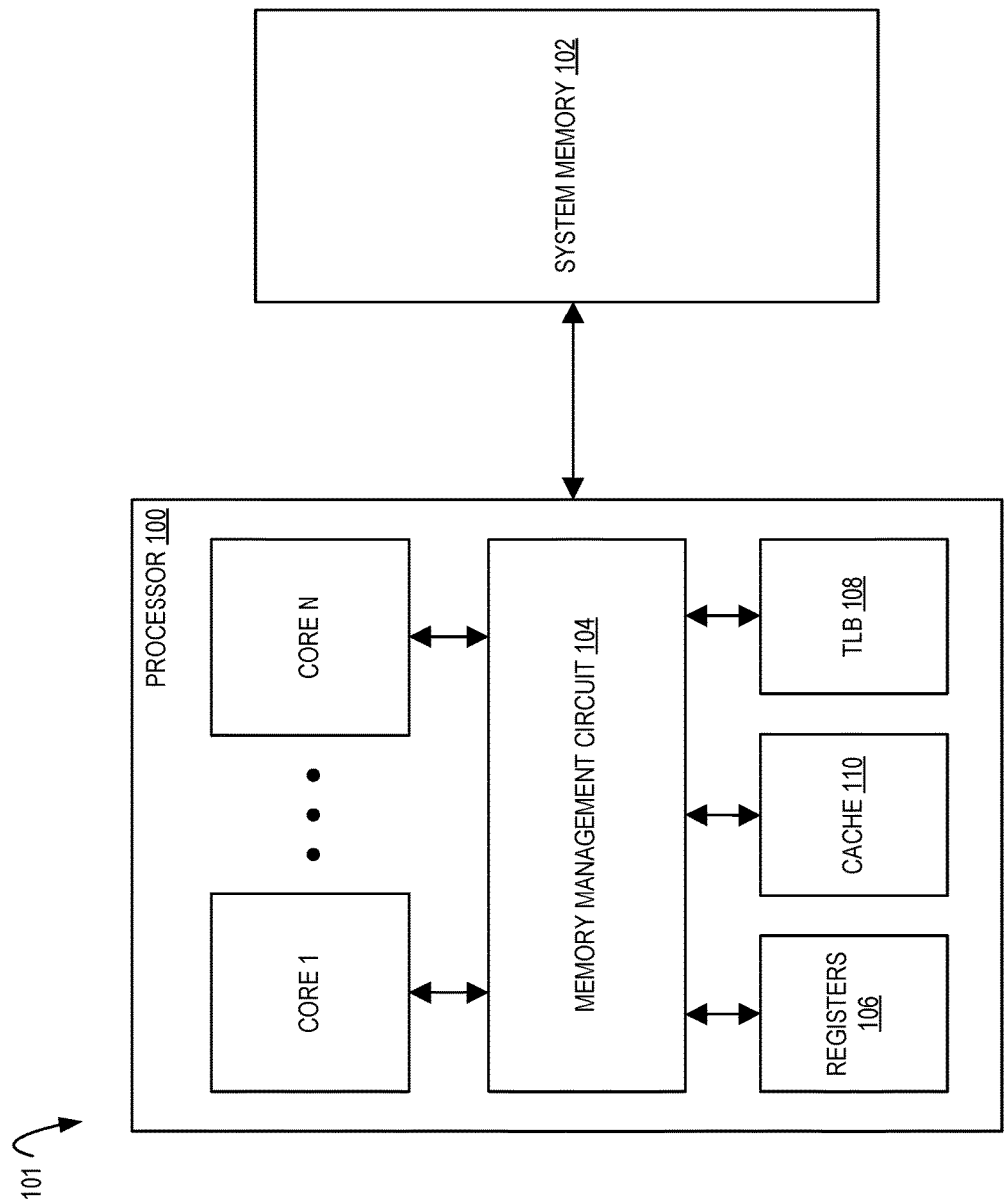
FIG. 1 illustrates a processor and memory management circuit according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions.

An instruction or instructions to be executed may be separated into a plurality of transactions, e.g., for concurrent execution. For example, instructions may be separated into different threads (e.g., threads of execution). A thread may generally refer to the smallest sequence (e.g., stream) of instructions that may be managed independently, e.g., by a scheduler, for execution. A scheduler may schedule execution of instructions of a thread on a core (or other execution resources) of the processor. An instruction (e.g., of a thread) may access (e.g., store or load) data in memory (e.g., cache or system memory). Memory may be divided into separate blocks, e.g., (e.g., one or more cache lines), of data that may be managed as a unit for coherence purposes. In certain embodiments, a (e.g., data) pointer (e.g., an address) is a value that refers to (e.g., points) the location of data, for example, a pointer may be an (e.g., linear) address and that data may be stored at that (e.g., linear) address. In certain embodiments, memory may be divided into multiple lines and each line may be have its own (unique) address. For example, a line of memory may include storage for 512 bits, 256 bits, 128 bits, 64 bits, 32 bits, 16 bits, or 8 bits of data. An address may be a virtual address or a physical address. A processor (e.g., a memory management circuit (unit) thereof) may convert a virtual address (e.g., as seen by a program running on the processor) to a physical address (e.g., the address in memory hardware).

A translation lookaside buffer (e.g., TLB) may convert a virtual address to a physical address (e.g., of the system memory). A TLB may include a data table to store (e.g., recently used) virtual-to-physical memory address translations, e.g., such that the translation does not have to be performed on each virtual address present to obtain the physical memory address corresponding to that virtual address. If the virtual address entry is not in the TLB, a processor (e.g., memory management circuit) may perform a page walk to determine the virtual-to-physical memory address translation.

Turning now to the Figures, FIG. 1 illustrates a (e.g., hardware) processor 100 and memory management circuit 104 of a computing system 101 according to embodiments of the disclosure. Hardware processor 100 may include one or more cores (e.g., cores 1 to N). Processor 100 (e.g., each core thereof) may include a hardware decoder (e.g., decode circuit) to decode an instruction, e.g., an instruction that is to request access to memory, for example, cache 110 (e.g., cache memory) or system (e.g., main) memory 102. Cache 110 is depicted as a component of processor 100. Instruction may include a virtual address for the portion (e.g., line) of memory. Processor 100 (e.g., each core thereof) may include a hardware execution unit (e.g., execution circuit) to execute the decoded instruction, e.g., the instruction that is to request access to memory. Hardware processor 100 may include one or more registers 106, for example, a page table base register (PTBR), which may be referred to as control register three (CR3). For example, each PTBR may store an address or reference to a page directory for a process or context for a corresponding thread.

Hardware processor 100 includes a coupling (e.g., connection) to system memory 102. Memory 102 may be a main memory local to the hardware processor (e.g., system memory). Note that the figures herein may not depict all data communication connections. One of ordinary skill in the art will appreciate that this is to not obscure certain details in the figures. Note that a single headed arrow herein may not require one-way communication, for example, it may indicate two-way communication (e.g., to and from that component). Note that a double headed arrow in the figures may not require two-way communication, for example, it may indicate one-way communication (e.g., to or from that component or device). Any or all combinations of communications paths may be utilized in certain embodiments herein.

Hardware processor 100 includes a memory management circuit (e.g., memory management unit) 104, for example, to control and/or provide access (for example, for a memory access request, e.g., from a core) to the (e.g., addressable memory) memory. In one embodiment, hardware processor includes a connection to the memory. In one embodiment, a hardware processor includes multiple cores (e.g., with respective execution unit(s)) and a single memory management circuit for the processor. Memory management circuit may be on chip with a processor or processor core. Memory management circuit may be separate from a processor. Memory management circuit may be disposed between a processor (e.g., core thereof) and a (e.g., a level of a multiple level) cache. Memory management circuit may be disposed between levels of a multiple level cache. Memory management circuit may be disposed between a system memory and a (e.g., level of a multiple level) cache.

Translation lookaside buffer 108 (e.g., TLB) may convert a virtual address (VA) to a physical address (PA). A TLB may include a data table to store (e.g., recently used) virtual-to-physical memory address translations, e.g., such that the translation does not have to be performed on each virtual address present to obtain the physical memory address corresponding to that virtual address. If the virtual address entry is not in the TLB, processor 100 (e.g., memory management circuit 104) may perform a page walk to determine the virtual-to-physical memory address translation. Translation lookaside buffer 108 may be within memory management circuit 104 or separate from memory management circuit 104, e.g., as depicted. One example of a TLB is discussed below in reference to FIG. 2.

Figure 2:
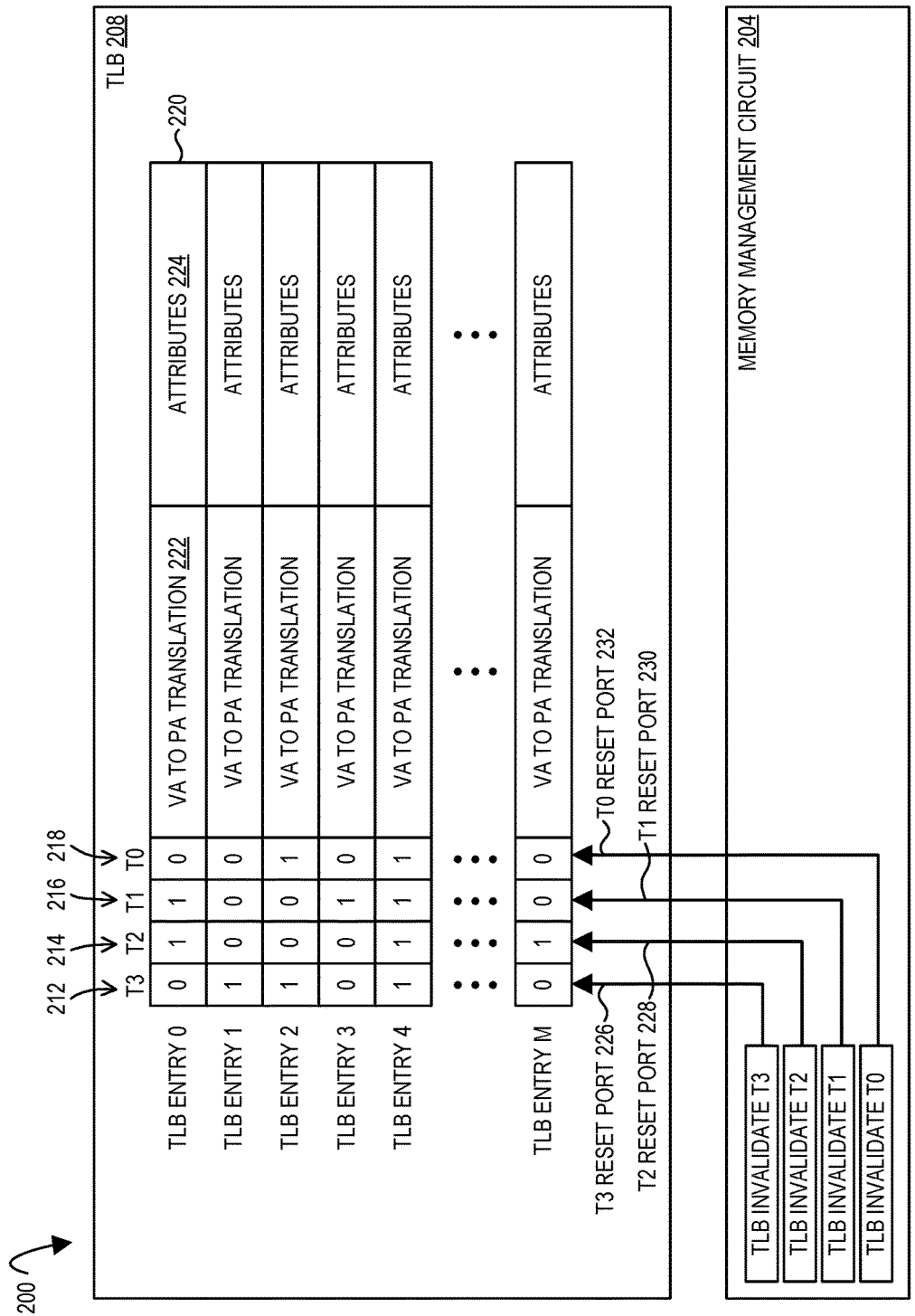
FIG. 2 illustrates a memory management circuit and translation lookaside buffer according to embodiments of the disclosure.

FIG. 2 illustrates a memory management circuit 204 and translation lookaside buffer (TLB) 208 of a system 200 according to embodiments of the disclosure. Memory management circuit 204 may populate and/or invalidate entries in TLB 208. In one embodiment, TLB is shared by a plurality of cores or other execution resources. Examples of execution resources include a thread, a process, a context, a virtual machine, a logical processor, a hardware thread, a core, and a processor. In the depicted embodiment, TLB 208 is shared by four threads (T3-T0). In another embodiment, TLB is shared by any plurality of threads. TLB 208 may include any number of entries, e.g., 0-M. An (e.g., each) entry in TLB 208 may include a plurality of bit positions (e.g., 212, 214, 216, 218 for thread three (T3) to thread zero (T0), respectively in FIG. 2) indicating that a virtual address to physical address translation 222 for that entry is valid for a particular thread or threads. For example, entry 220 includes one bit set (e.g., to a logical one) for thread 2 (T2) and one bit set (e.g., to a logical one) for thread 1 (T0) while the other bits remain cleared (e.g., set to a logical zero) to indicate that the virtual address to physical address translation 222 is valid for thread 1 (T1) and thread 2 (T2), e.g., but invalid for thread 3 (T3) and thread zero (T0), e.g., the virtual address to physical address translation 222 is shared between T2 and T1. In one embodiment, the number of threads is any number, for example, 10, 100, 1000, etc., e.g., the number of threads may be the total number of threads supported for execution by the processor. In one embodiment, clearing of the sharing bits (e.g., bit positions) does not clear or affect any other field in an entry, e.g., the stale data remains. In one embodiment, clearing of all (e.g., the remaining) set sharing bits (e.g., bit positions) causes a clear of one or more (e.g., all) of the other fields in that entry.

In certain embodiments, memory management circuit 204 is to set each bit position in an entry when the corresponding thread is to use the virtual to physical address translation (e.g., mapping) for that entry. Additionally, an entry may optionally include an attribute 224 field. In one embodiment, attribute 224 field includes one or more of a read/write permission and a user/supervisor level.

As an example, a first virtual address is referenced by thread one (T1). Assuming there is no corresponding translation in TLB 208 at that time, e.g., a TLB miss occurred, then the first virtual address is translated to the physical address for thread one (T1), e.g., by memory management circuit 204. In a page table data structure, the page table base register (PTBR) for thread one (T1) in combination with the first virtual address results in a translation to a physical address through a page directory entry (PDE) and a page table entry (PTE). The first virtual address to first physical address translation may be stored in translation 222 field, and any other information, such as offset information, may be stored in attributes 224 field. In addition, bit 216 is set to represent that entry 220 is associated with thread one (T1).

In one embodiment, setting bit 216 includes masking a logical value into bit 216's position within entry 220. For example, if bit 216 is in a default logical zero state to represent that entry 220 is empty or not associated with thread one (T1), then a logical one value is stored (e.g., masked) into bit 216 to represent entry 220 is associated with thread one (T1). Next, assume thread two (T2) references the first virtual address stored in entry 220. In one embodiment, TLB 208 is read, but bit 214 is not set in entry 220, thus entry 220 is not associated with thread two (T2) at that time. Consequently, a miss to TLB 208 occurs. The translation for the first virtual address may be translated to the physical address for thread two (T2), e.g., by memory management circuit 204. The physical address for thread two (T2) may be compared to entry 220 (e.g., the physical address stored in translation 222) and if there is a match, bit 214 is set to represent that entry 220 is also associated with thread two (T2).

In one embodiment, each entry includes a (e.g., single) bit for each thread but does not include a context identifier (ID). The context ID may be an identifier of a memory space, e.g., and threads with the same context ID meaning that the threads are sharing the same memory space.

The above discusses setting of the bit positions (e.g., 212, 214, 216, 218 for thread three (T3) to thread zero (T0), respectively in FIG. 2) indicating that a virtual address to physical address translation (e.g., translation 222) for that entry is valid for a particular thread or threads. In certain embodiments, a bit or bits of the bit positions are to be cleared (e.g., invalidated). For example, a memory management circuit may clear all set bits for a thread by asserting a reset command to a respective reset port of the translation lookaside buffer for the thread. A translation lookaside buffer (e.g., circuit) may include a separate reset (hardware) port for each of a plurality of threads included in the TLB entries.

In one embodiment, a memory management circuit is to clear all set bits (e.g., one bit per thread for each thread in each TLB entry) for a thread without the use of a context ID. In one embodiment, a reset of these sharing bits is caused by an operating system switching a context (e.g., page in and page out memory) (e.g., page swap) or moving applications from one memory space to another memory space. In one computer architecture, a way to identify a need to reset the sharing bits is when software writes to a control register (e.g., page table base register). When thread sharing is implemented by associating threads with context IDs (as opposed to the sharing bits disclosed herein), separating a thread from a shared context ID may be complex. One brute force solution is to flush the entire TLB when a control register (e.g., CR3) is modified. This solution may come at the high cost of performance, e.g., where page translation is resource intensive and requires a long time to rebuild a TLB's entries after losing all translations. Certain embodiments herein do not flush the entire TLB, e.g., when the entries for a particular thread are to be invalidated in a TLB. Certain embodiments herein do not require a piece of specialized logic in hardware and/or microcode flow to remember how context IDs are mapped to threads and manage how context IDs should be reassigned.

In one embodiment, a request for invalidation of a thread or threads (e.g., less than all of the threads in each TLB entry) is received, e.g., by a memory management circuit detecting a control register (e.g., page table base register) is written or page swapping has happened in software, and the memory management circuit is to invalidate those entries in the TLB for the affected threads, e.g., those threads whose translations are no longer correct, to ensure functional correctness. In one embodiment, a page swap causes a swap from a first page having a first translation to a first physical address for a first virtual address to a different page having a different translation. Depicted translation lookaside buffer 208 includes a respective reset port (226, 228, 230, 232) for each of the plurality of threads (T3, T2, T1, T0, respectively). In one embodiment, a reset command (e.g., TLB invalidate) for a thread causes only a reset (e.g., clearing of the set sharing bits) for the thread and no other threads. In one embodiment, a TLB's receipt of a reset command is to reset each set bit for an entire thread (for example, asserting TLB invalidate T3 to clear all set bits in the TLB entries 0-M for T3), for example, concurrently or within a same (e.g., single) clock cycle (e.g., instantly). In one embodiment, memory management circuit is to cause a reset for each set bit of an entire thread (e.g., first column of TLB for entries 0-M) without apply a multiple bit mask to the plurality of bit positions in an entry to clear all set bits, e.g., on an entry by entry basis.

For example, if T1's (e.g., page) translation has been changed, a "TLB invalidate T1" reset command is issued by the memory management circuit to TLB 208, e.g., so that the T1 valid bits of entry 0, 3, and 4 are cleared after the reset command is received by T1 reset port 230, representing that these entries are no longer associated with T1 but the translations of the other threads are not affected.

FIG. 3 illustrates a flow diagram 300 according to embodiments of the disclosure. Depicted flow 300 includes providing a translation lookaside buffer comprising a plurality of entries, each entry comprising a virtual address to physical address translation and a plurality of bit positions, and each set bit of the plurality of bit positions in each entry indicating that the virtual address to physical address translation is valid for a respective thread of a plurality of threads 302; and clearing all set bits for a thread by a memory management circuit asserting a reset command to a respective reset port of the translation lookaside buffer for the thread, wherein the translation lookaside buffer comprises a separate reset port for each of the plurality of threads 304.

In one embodiment, a processor includes one or more cores to execute a plurality of threads; a translation lookaside buffer comprising a plurality of entries, each entry comprising a virtual address to physical address translation and a plurality of bit positions, and each set bit of the plurality of bit positions in each entry indicating that the virtual address to physical address translation is valid for a respective thread of the plurality of threads; and a memory management circuit to clear all set bits for a thread by asserting a reset command to a respective reset port of the translation lookaside buffer for the thread, wherein the translation lookaside buffer comprises a separate reset port for each of the plurality of threads. Each entry in the translation lookaside buffer may not include a context identifier (ID). The memory management circuit may assert the reset command when a page swap for a page containing the thread is detected. The memory management circuit may assert the reset command when a write to a page table base register for a page containing the thread is detected. The memory management circuit may not apply a multiple bit mask to the plurality of bit positions in an entry to clear all set bits. The memory management circuit may concurrently clear all set bits for a first thread by asserting a first reset command to a first reset port of the translation lookaside buffer and concurrently clear all set bits for a second thread by asserting a second reset command to a second reset port of the translation lookaside buffer. The memory management circuit may concurrently clear all set bits for a first thread by asserting a first reset command to a first reset port of the translation lookaside buffer and concurrently clear all set bits for a second thread by asserting a second reset command to a second reset port of the translation lookaside buffer, but not clear any set bits for a third thread of the plurality of threads in response to the first reset command and the second reset command being asserted. The memory management circuit may concurrently clear all set bits for a first thread by asserting a first reset command to a first reset port of the translation lookaside buffer, but not clear any set bits for other threads of the plurality of threads in response to the first reset command being asserted.

In another embodiment, a method includes providing (e.g., populating) a translation lookaside buffer comprising a plurality of entries, each entry comprising a virtual address to physical address translation and a plurality of bit positions, and each set bit of the plurality of bit positions in each entry indicating that the virtual address to physical address translation is valid for a respective thread of a plurality of threads; and clearing all set bits for a thread by a memory management circuit asserting a reset command to a respective reset port of the translation lookaside buffer for the thread, wherein the translation lookaside buffer comprises a separate reset port for each of the plurality of threads. The method may include each entry in the translation lookaside buffer not including a context identifier (ID). The method may include the memory management circuit asserting the reset command when a page swap for a page containing the thread is detected. The method may include the memory management circuit asserting the reset command when a write to a page table base register for a page containing the thread is detected. The method may include the memory management circuit not applying a multiple bit mask to the plurality of bit positions in an entry to clear all set bits. The method may include the memory management circuit concurrently clearing all set bits for a first thread by asserting a first reset command to a first reset port of the translation lookaside buffer and concurrently clearing all set bits for a second thread by asserting a second reset command to a second reset port of the translation lookaside buffer. The method may include the memory management circuit concurrently clearing all set bits for a first thread by asserting a first reset command to a first reset port of the translation lookaside buffer and concurrently clearing all set bits for a second thread by asserting a second reset command to a second reset port of the translation lookaside buffer, but does not clear any set bits for a third thread of the plurality of threads in response to the first reset command and the second reset command being asserted. The method may include the memory management circuit concurrently clearing all set bits for a first thread by asserting a first reset command to a first reset port of the translation lookaside buffer, but not clearing any set bits for other threads of the plurality of threads in response to the first reset command being asserted.

In another embodiment, a system includes one or more cores of a processor to execute a plurality of threads; a memory coupled to the one or more cores; a translation lookaside buffer comprising a plurality of entries for the memory, each entry comprising a virtual address to physical address translation and a plurality of bit positions, and each set bit of the plurality of bit positions in each entry indicating that the virtual address to physical address translation is valid for a respective thread of the plurality of threads; and a memory management circuit to clear all set bits for a thread by asserting a reset command to a respective reset port of the translation lookaside buffer for the thread, wherein the translation lookaside buffer comprises a separate reset port for each of the plurality of threads. Each entry in the translation lookaside buffer may not include a context identifier (ID). The memory management circuit may assert the reset command when a page swap for a page containing the thread is detected. The memory management circuit may assert the reset command when a write to a page table base register for a page containing the thread is detected. The memory management circuit may not apply a multiple bit mask to the plurality of bit positions in an entry to clear all set bits. The memory management circuit may concurrently clear all set bits for a first thread by asserting a first reset command to a first reset port of the translation lookaside buffer and concurrently clear all set bits for a second thread by asserting a second reset command to a second reset port of the translation lookaside buffer. The memory management circuit may concurrently clear all set bits for a first thread by asserting a first reset command to a first reset port of the translation lookaside buffer and concurrently clear all set bits for a second thread by asserting a second reset command to a second reset port of the translation lookaside buffer, but not clear any set bits for a third thread of the plurality of threads in response to the first reset command and the second reset command being asserted. The memory management circuit may concurrently clear all set bits for a first thread by asserting a first reset command to a first reset port of the translation lookaside buffer, but not clear any set bits for other threads of the plurality of threads in response to the first reset command being asserted.

In yet another embodiment, a non-transitory machine readable medium that stores code that when executed by a machine causes the machine to perform a method including populating a translation lookaside buffer comprising a plurality of entries, each entry comprising a virtual address to physical address translation and a plurality of bit positions, and each set bit of the plurality of bit positions in each entry indicating that the virtual address to physical address translation is valid for a respective thread of a plurality of threads; and clearing all set bits for a thread by a memory management circuit asserting a reset command to a respective reset port of the translation lookaside buffer for the thread, wherein the translation lookaside buffer comprises a separate reset port for each of the plurality of threads. The method may include each entry in the translation lookaside buffer not including a context identifier (ID). The method may include the memory management circuit asserting the reset command when a page swap for a page containing the thread is detected. The method may include the memory management circuit asserting the reset command when a write to a page table base register for a page containing the thread is detected. The method may include the memory management circuit not applying a multiple bit mask to the plurality of bit positions in an entry to clear all set bits. The method may include the memory management circuit concurrently clearing all set bits for a first thread by asserting a first reset command to a first reset port of the translation lookaside buffer and concurrently clearing all set bits for a second thread by asserting a second reset command to a second reset port of the translation lookaside buffer. The method may include the memory management circuit concurrently clearing all set bits for a first thread by asserting a first reset command to a first reset port of the translation lookaside buffer and concurrently clearing all set bits for a second thread by asserting a second reset command to a second reset port of the translation lookaside buffer, but does not clear any set bits for a third thread of the plurality of threads when the first reset command and the second reset command are asserted. The method may include the memory management circuit concurrently clearing all set bits for a first thread by asserting a first reset command to a first reset port of the translation lookaside buffer, but not clearing any set bits for other threads of the plurality of threads in response to the first reset command being asserted.

In another embodiment, a processor includes means to execute a plurality of threads; a translation means comprising a plurality of entries, each entry comprising a virtual address to physical address translation and a plurality of bit positions, and each set bit of the plurality of bit positions in each entry indicating that the virtual address to physical address translation is valid for a respective thread of the plurality of threads; and means to clear all set bits for a thread by asserting a reset command to a respective reset port of the translation means for the thread, wherein the translation means comprises a separate reset port for each of the plurality of threads.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, June 2016; and see Intel® Architecture Instruction Set Extensions Programming Reference, February 2016).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 4A is a block diagram illustrating both an exemplary in-order pipeline and an exemplary register renaming, out-of-order issue/execution pipeline according to embodiments of the disclosure. FIG. 4B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 5B:
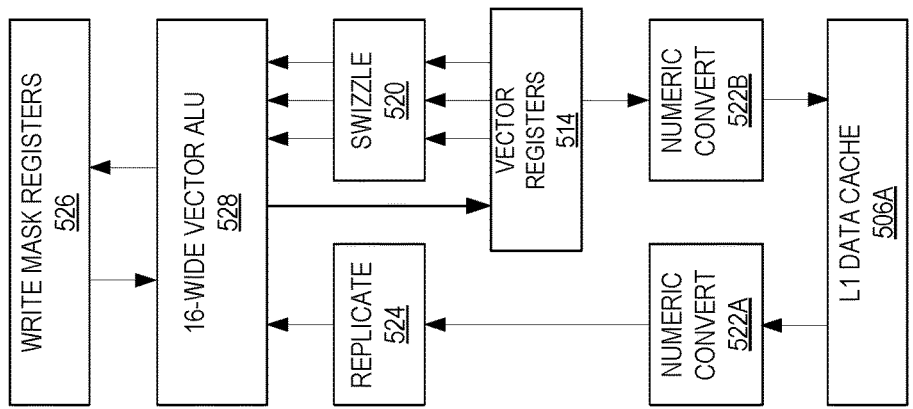
FIG. 5B is an expanded view of part of the processor core in FIG. 5A according to embodiments of the disclosure.
Figure 5A:
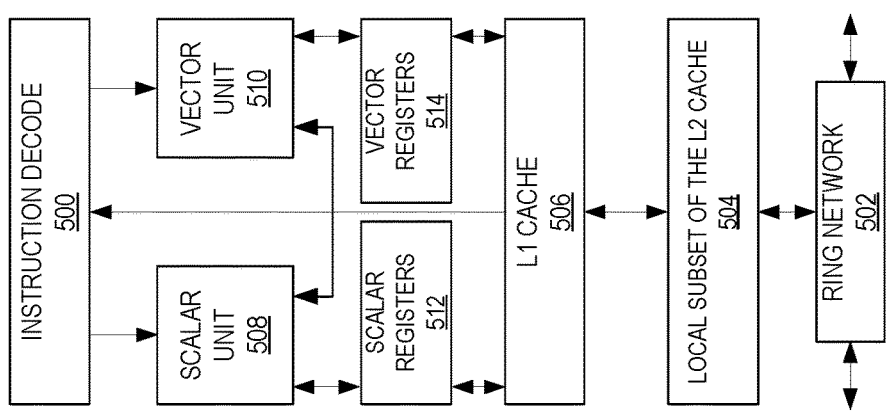
FIG. 5A is a block diagram of a single processor core, along with its connection to the on-die interconnect network and with its local subset of the Level 2 (L2) cache, according to embodiments of the disclosure.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the disclosure. In one embodiment, an instruction decode unit 500 supports the x86 instruction set with a packed data instruction set extension.

An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the disclosure may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 5B is an expanded view of part of the processor core in FIG. 5A according to embodiments of the disclosure. FIG. 5B includes an L1 data cache 506A part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
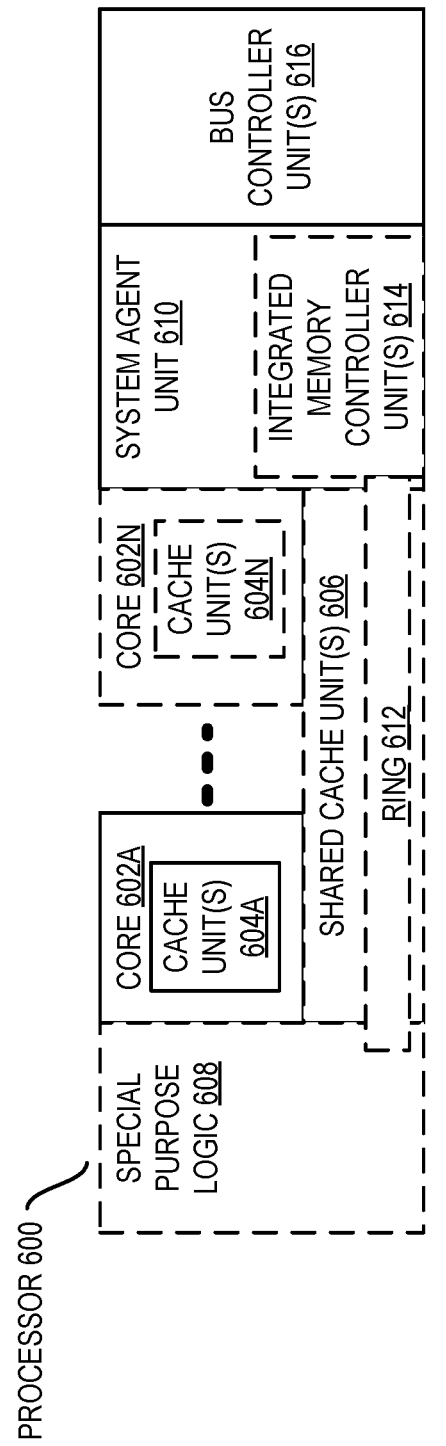
FIG. 6 is a block diagram of a processor that may have more than one core, may have an integrated memory controller, and may have integrated graphics according to embodiments of the disclosure.

FIG. 6 is a block diagram of a processor 600 that may have more than one core, may have an integrated memory controller, and may have integrated graphics according to embodiments of the disclosure. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multithreading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
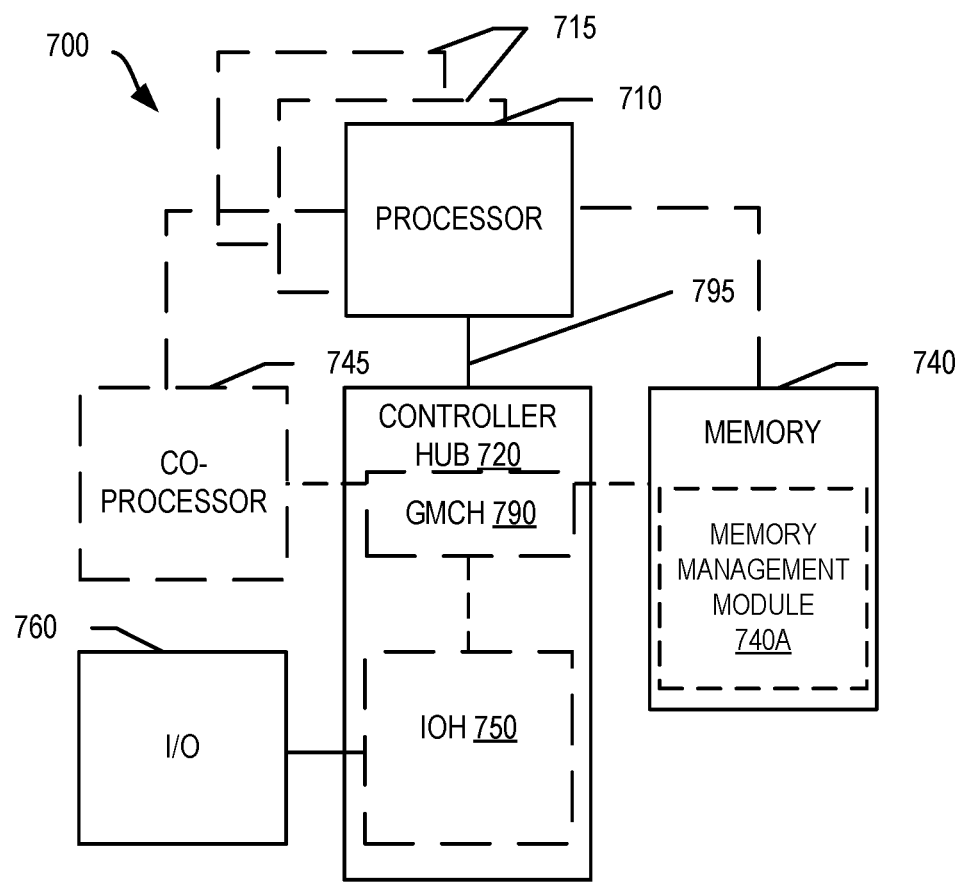
FIG. 7 is a block diagram of a system in accordance with one embodiment of the present disclosure.

Referring now to FIG. 7, shown is a block diagram of a system 700 in accordance with one embodiment of the present disclosure. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750. Memory 740 may include a memory (e.g., TLB) management module 740A, for example, to store code that when executed causes a processor to perform any method of this disclosure.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
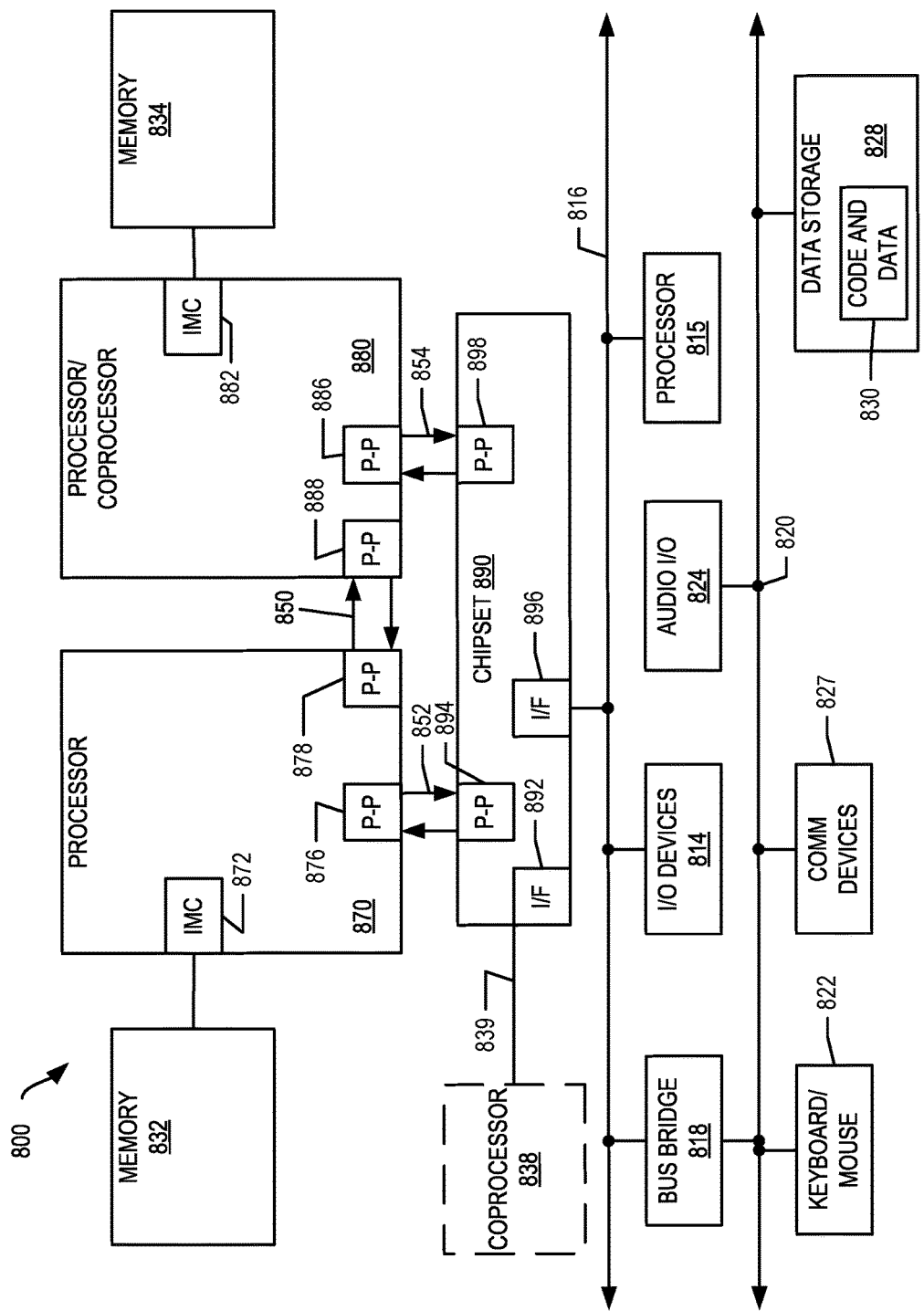
FIG. 8 is a block diagram of a more specific exemplary system in accordance with an embodiment of the present disclosure.

Referring now to FIG. 8, shown is a block diagram of a first more specific exemplary system 800 in accordance with an embodiment of the present disclosure. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the disclosure, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
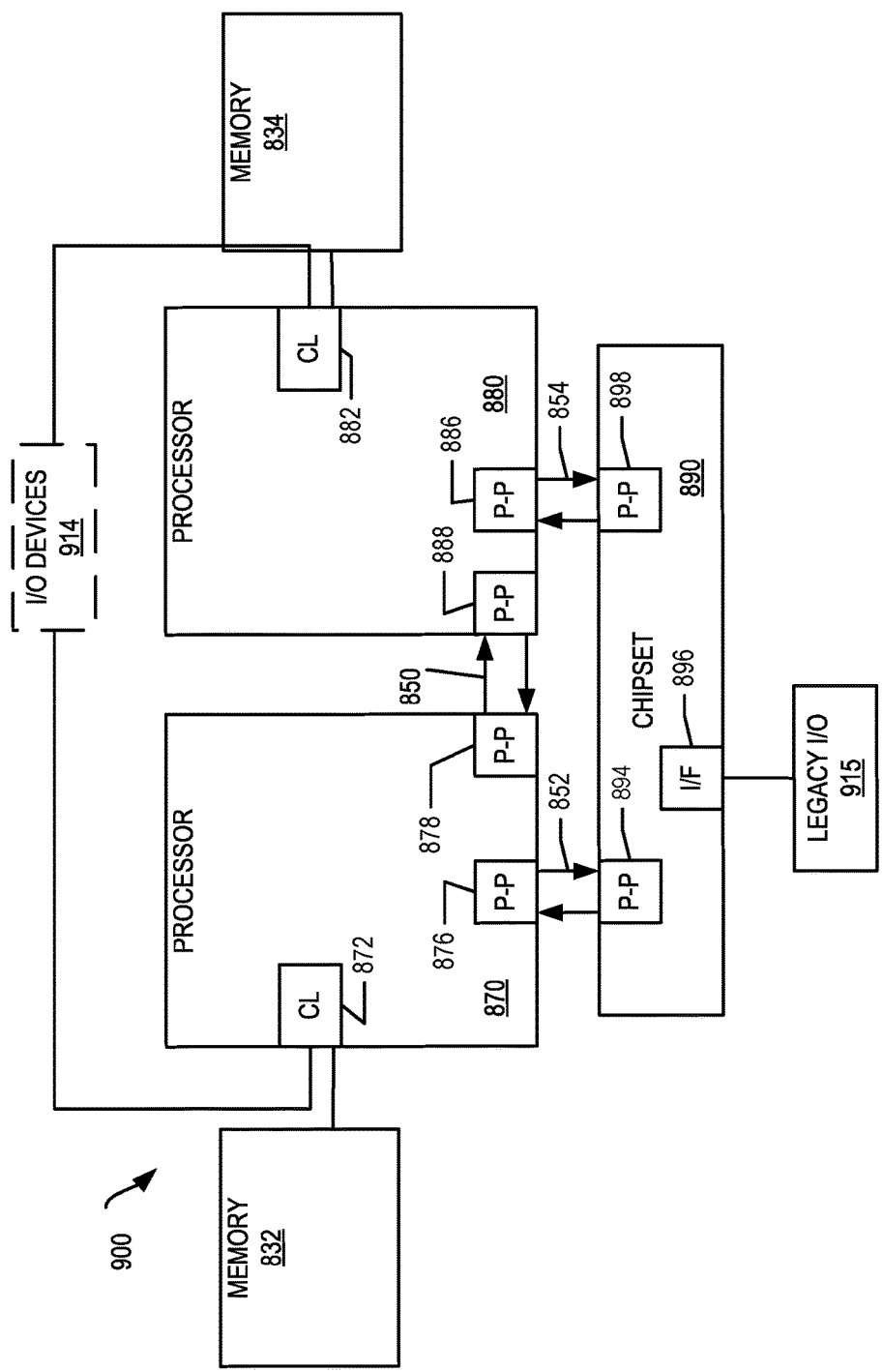
FIG. 9, shown is a block diagram of a second more specific exemplary system in accordance with an embodiment of the present disclosure.

Referring now to FIG. 9, shown is a block diagram of a second more specific exemplary system 900 in accordance with an embodiment of the present disclosure. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
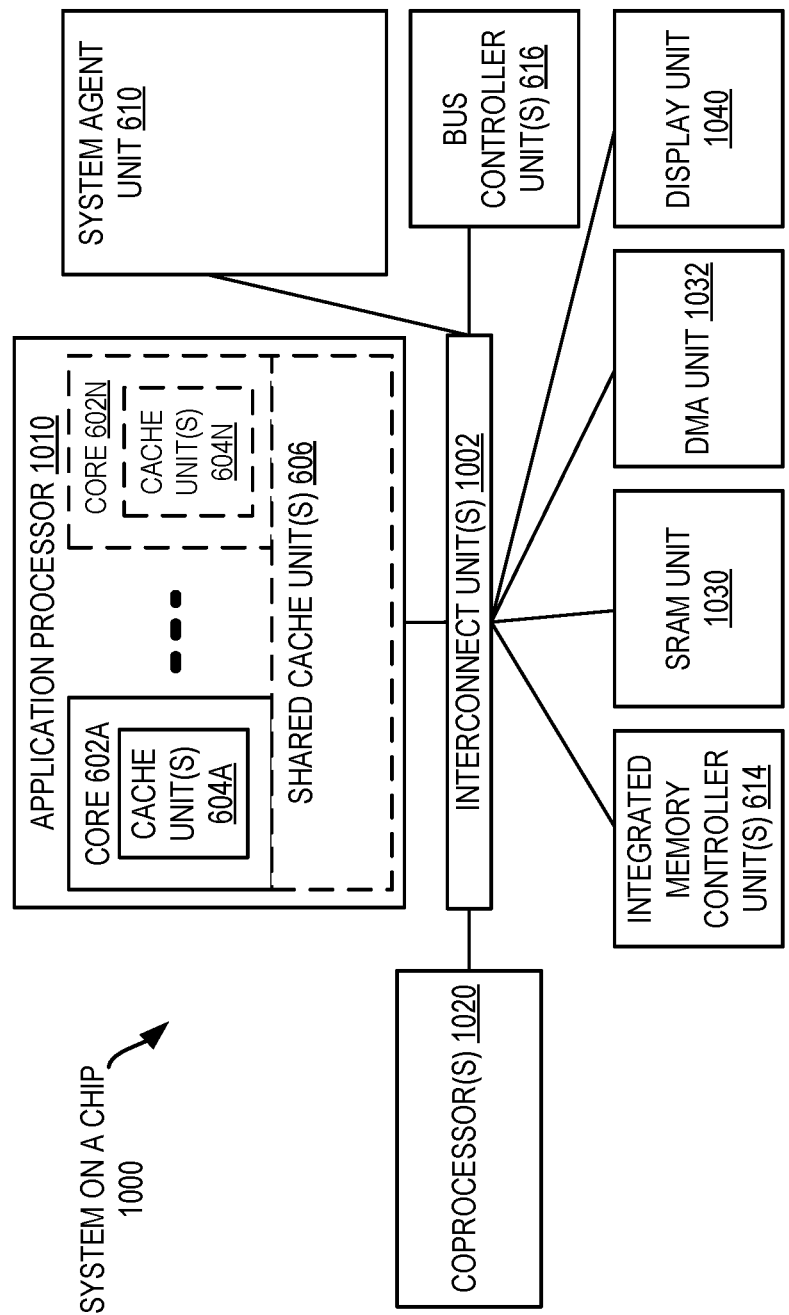
FIG. 10, shown is a block diagram of a system on a chip (SoC) in accordance with an embodiment of the present disclosure.

Referring now to FIG. 10, shown is a block diagram of a SoC 1000 in accordance with an embodiment of the present disclosure. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
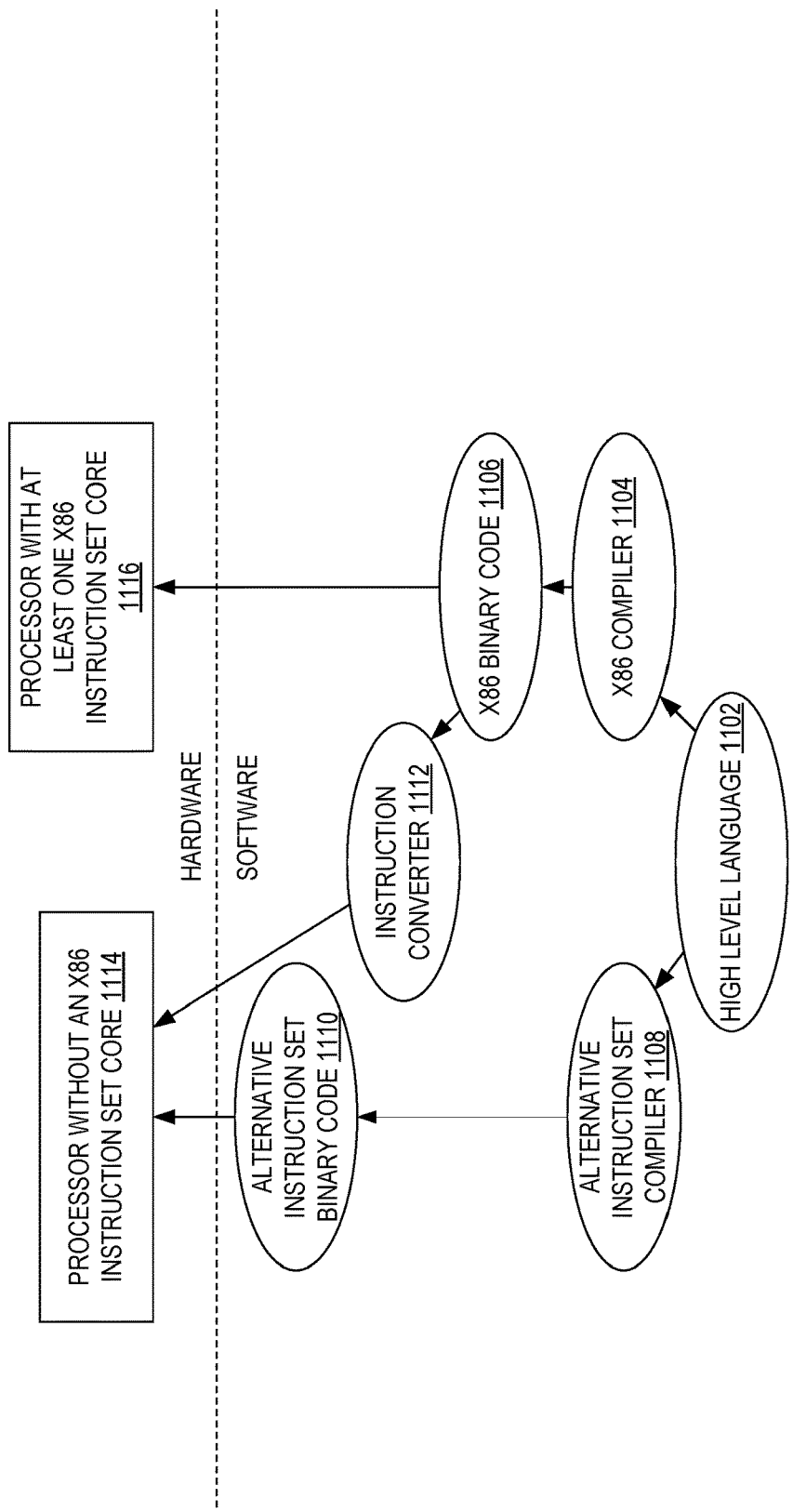
FIG. 11 is a block diagram contrasting the use of a software instruction converter to convert binary instructions in a source instruction set to binary instructions in a target instruction set according to embodiments of the disclosure.

FIG. 11 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

What is claimed is:

1. A method comprising:
   providing a translation lookaside buffer comprising a plurality of entries, each entry comprising a virtual address to physical address translation and a plurality of bit positions, and each set bit of the plurality of bit positions in each entry indicating that the virtual address to physical address translation is valid for a respective thread of a plurality of threads; and
   clearing all set bits for a thread by a memory management circuit asserting a reset command to a respective reset port of the translation lookaside buffer for the thread, wherein the memory management circuit is to not apply a multiple bit mask to clear set bits, and the translation lookaside buffer comprises a separate reset port for each of the plurality of threads.

2. The method of claim 1, wherein each entry in the translation lookaside buffer does not include a context identifier (ID).

3. The method of claim 1, wherein the memory management circuit asserts the reset command when a page swap for a page containing the thread is detected.

4. The method of claim 1, wherein the memory management circuit asserts the reset command when a write to a page table base register for a page containing the thread is detected.

5. The method of claim 1, wherein the plurality of bit positions of each entry is a total number of threads supported for execution.

6. The method of claim 1, wherein the memory management circuit concurrently clears all set bits for a first thread by asserting a first reset command to a first reset port of the translation lookaside buffer and concurrently clears all set bits for a second thread by asserting a second reset command to a second reset port of the translation lookaside buffer.

7. The method of claim 1, wherein the memory management circuit concurrently clears all set bits for a first thread by asserting a first reset command to a first reset port of the translation lookaside buffer and concurrently clears all set bits for a second thread by asserting a second reset command to a second reset port of the translation lookaside buffer, but does not clear any set bits for a third thread of the plurality of threads in response to the first reset command and the second reset command being asserted.

8. The method of claim 1, wherein the memory management circuit concurrently clears all set bits for a first thread by asserting a first reset command to a first reset port of the translation lookaside buffer, but does not clear any set bits for other threads of the plurality of threads in response to the first reset command being asserted.

9. A processor comprising:
one or more cores to execute a plurality of threads;
a translation lookaside buffer comprising a plurality of entries, each entry comprising a virtual address to physical address translation and a plurality of bit positions, and each set bit of the plurality of bit positions in each entry indicating that the virtual address to physical address translation is valid for a respective thread of the plurality of threads; and
a memory management circuit to clear all set bits for a thread by asserting a reset command to a respective reset port of the translation lookaside buffer for the thread, wherein the memory management circuit is to not apply a multiple bit mask to clear set bits, and the translation lookaside buffer comprises a separate reset port for each of the plurality of threads.

10. The processor of claim 9, wherein each entry in the translation lookaside buffer does not include a context identifier (ID).

11. The processor of claim 9, wherein the memory management circuit asserts the reset command when a page swap for a page containing the thread is detected.

12. The processor of claim 9, wherein the memory management circuit asserts the reset command when a write to a page table base register for a page containing the thread is detected.

13. The processor of claim 9, wherein the plurality of bit positions of each entry is a total number of threads supported for execution by the processor.

14. The processor of claim 9, wherein the memory management circuit is to concurrently clear all set bits for a first thread by asserting a first reset command to a first reset port of the translation lookaside buffer and concurrently clear all set bits for a second thread by asserting a second reset command to a second reset port of the translation lookaside buffer.

15. The processor of claim 9, wherein the memory management circuit is to concurrently clear all set bits for a first thread by asserting a first reset command to a first reset port of the translation lookaside buffer and concurrently clear all set bits for a second thread by asserting a second reset command to a second reset port of the translation lookaside buffer, but not clear any set bits for a third thread of the plurality of threads in response to the first reset command and the second reset command being asserted.

16. The processor of claim 9, wherein the memory management circuit is to concurrently clear all set bits for a first thread by asserting a first reset command to a first reset port of the translation lookaside buffer, but not clear any set bits for other threads of the plurality of threads in response to the first reset command being asserted.

17. A system comprising:
one or more cores of a processor to execute a plurality of threads;
a memory coupled to the one or more cores;
a translation lookaside buffer comprising a plurality of entries for the memory, each entry comprising a virtual address to physical address translation and a plurality of bit positions, and each set bit of the plurality of bit positions in each entry indicating that the virtual address to physical address translation is valid for a respective thread of the plurality of threads; and
a memory management circuit to clear all set bits for a thread by asserting a reset command to a respective reset port of the translation lookaside buffer for the thread, wherein the memory management circuit is to not apply a multiple bit mask to clear set bits, and the translation lookaside buffer comprises a separate reset port for each of the plurality of threads.

18. The system of claim 17, wherein each entry in the translation lookaside buffer does not include a context identifier (ID).

19. The system of claim 17, wherein the memory management circuit asserts the reset command when a page swap for a page containing the thread is detected.

20. The system of claim 17, wherein the memory management circuit asserts the reset command when a write to a page table base register for a page containing the thread is detected.

21. The system of claim 17, wherein the plurality of bit positions of each entry is a total number of threads supported for execution by the processor.

22. The system of claim 17, wherein the memory management circuit is to concurrently clear all set bits for a first thread by asserting a first reset command to a first reset port of the translation lookaside buffer and concurrently clear all set bits for a second thread by asserting a second reset command to a second reset port of the translation lookaside buffer.

23. The system of claim 17, wherein the memory management circuit is to concurrently clear all set bits for a first thread by asserting a first reset command to a first reset port of the translation lookaside buffer and concurrently clear all set bits for a second thread by asserting a second reset command to a second reset port of the translation lookaside buffer, but not clear any set bits for a third thread of the plurality of threads in response to the first reset command and the second reset command being asserted.

24. The system of claim 17, wherein the memory management circuit is to concurrently clear all set bits for a first thread by asserting a first reset command to a first reset port of the translation lookaside buffer, but not clear any set bits for other threads of the plurality of threads in response to the first reset command being asserted.

\* \* \* \* \*